US009799080B2

(12) United States Patent
Lee et al.

(10) Patent No.: US 9,799,080 B2
(45) Date of Patent: Oct. 24, 2017

(54) METHOD AND APPARATUS FOR PROVIDING A CONTACT ADDRESS

(71) Applicant: Samsung Electronics Co., Ltd., Gyeonggi-do (KR)

(72) Inventors: Sang-Woo Lee, Gyeonggi-do (KR); Jong-Sung Joo, Seoul (KR); Se-Jun Song, Seoul (KR); Young-Seok Lim, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 176 days.

(21) Appl. No.: 14/208,256

(22) Filed: Mar. 13, 2014

(65) Prior Publication Data

US 2014/0280097 A1 Sep. 18, 2014

(30) Foreign Application Priority Data

Mar. 14, 2013 (KR) ........................ 10-2013-0027083

(51) Int. Cl.
*H04M 1/00* (2006.01)
*G06Q 50/00* (2012.01)

(52) U.S. Cl.
CPC .................................... *G06Q 50/01* (2013.01)

(58) Field of Classification Search
CPC ....... H04M 1/274583; H04M 1/72566; H04M 1/72572; H04M 3/42348; H04M 1/645; H04M 1/72552; H04M 1/72569; H04M 1/72586; H04M 3/563; H04M 2201/60; H04M 2203/158; H04M 2203/2033; H04M 2203/2038; H04M 2203/2072; H04L 67/24; H04L 67/22; H04L 51/066; H04W 76/007; H04W 8/22; H04W 92/18
USPC ............ 370/252; 715/752; 455/414.4, 456.4
See application file for complete search history.

(56) References Cited

U.S. PATENT DOCUMENTS 6,823,184 B1 * 11/2004 Nelson .................. H04M 1/642 455/412.2
7,106,852 B1 * 9/2006 Nelson .................. H04M 1/645 379/387.01
7,286,649 B1 * 10/2007 Nelson .................... H04W 4/18 379/52

(Continued)

*Primary Examiner* — Dennis Truong
(74) *Attorney, Agent, or Firm* — Cha & Reiter, LLC

(57) ABSTRACT

An apparatus and method for providing a contact address based on context information and an indication of a recommended contact and a preferred communication channel for reaching the recommended contact. The indication is based on pre-stored context information that matches the current context information. The communication channel may be one of a social networking service (SNS), a mobile phone number, a home phone number, a business phone number, a short message services (SMS), and a multimedia message service (MMS). The method may include: detecting, by an electronic device, current context information of the electronic device; comparing the current context information with prestored context information; and outputting an indication of a recommended contact and a preferred communication channel for reaching the recommended contact, wherein the indication is output based on the prestored context information matching the current context information.

20 Claims, 9 Drawing Sheets

(56) References Cited

U.S. PATENT DOCUMENTS

| | | | | |
|---|---|---|---|---|
| 7,986,941 | B2 * | 7/2011 | Luo | H04M 1/642 370/259 |
| 8,229,086 | B2 * | 7/2012 | Bluvband | H04M 1/645 379/88.13 |
| 8,290,132 | B2 | 10/2012 | Klemm | |
| 8,576,828 | B1 * | 11/2013 | Massey, Jr. | H04M 3/02 370/349 |
| 8,825,030 | B2 * | 9/2014 | Xu | H04M 1/72572 455/418 |
| 8,954,038 | B2 * | 2/2015 | Nassimi | H04M 3/42153 340/7.28 |
| 2003/0224814 | A1 * | 12/2003 | Qu | H04L 12/5835 455/517 |
| 2003/0228002 | A1 * | 12/2003 | Tucker | H04M 1/6505 379/88.01 |
| 2005/0289180 | A1 * | 12/2005 | Pabla | G06Q 10/109 |
| 2005/0289470 | A1 * | 12/2005 | Pabla | G06F 21/41 715/751 |
| 2006/0053379 | A1 * | 3/2006 | Henderson | G06F 3/0481 715/751 |
| 2006/0117094 | A1 | 6/2006 | Li | |
| 2007/0004389 | A1 * | 1/2007 | Wallace | G06Q 10/06 455/415 |
| 2008/0057925 | A1 * | 3/2008 | Ansari | H04M 1/72552 455/414.4 |
| 2009/0089806 | A1 | 4/2009 | Mayer | |
| 2009/0165145 | A1 * | 6/2009 | Haapsaari | H04M 1/72563 726/28 |
| 2010/0099354 | A1 * | 4/2010 | Johnson | H04M 1/7253 455/41.1 |
| 2010/0159998 | A1 * | 6/2010 | Luke | H04M 1/6041 455/567 |
| 2012/0191777 | A1 * | 7/2012 | Iwasaki | G06Q 10/10 709/204 |
| 2013/0014040 | A1 * | 1/2013 | Jagannathan | G06Q 50/01 715/765 |
| 2013/0017806 | A1 * | 1/2013 | Sprigg | H04M 1/66 455/411 |
| 2013/0142056 | A1 * | 6/2013 | Abplanalp | H04W 8/18 370/252 |
| 2014/0071858 | A1 * | 3/2014 | Sylvain | H04L 67/306 370/259 |
| 2014/0080410 | A1 * | 3/2014 | Jung | H04B 5/00 455/41.1 |

* cited by examiner

| | Contact A | Contact B | Contact C |
|---|---|---|---|
| SIMPLE SUM | 268.1 | 260.6 | 195.6 |
| WEIGHTED TOTAL SCORE | 262.13 | 327.28 | 248.88 |

METHOD AND APPARATUS FOR PROVIDING A CONTACT ADDRESS

CLAIM OF PRIORITY

This application claims priority under 35 U.S.C. §119 to an application filed in the Korean Intellectual Property Office on Mar. 14, 2013 and assigned Serial No. 10-2013-0027083, the contents of which are incorporated herein by reference.

BACKGROUND

1.Field of the Disclosure

Aspects of the present disclosure relate to electronic devices and more particularly, to a method and apparatus for providing a contact address.

2.Description of the Related Art

Communication technology enables persons to communicate with other persons through various communication devices and various communication channels. Examples of the communication devices and the communication channels include home phones, business phones, mobile phones, e-mails, text messaging, instant messaging, short message services (SMS), and social networking services (SNS). The use of such communication devices and communication channels increases the availability of persons for person-to-person communication.

However, in some aspects, a person attempting to contact another person has no way to quantitatively or qualitatively determine which communication channel for reaching the other person is the most effective. Thus, the person may have to use a trial-and-error strategy to find a communications channel the other person is reachable over. However, doing some may be frustrating to the user and result in waste of time. Accordingly, the need exists for new techniques for establishing communications channels.

SUMMARY

The present disclosure addresses this need. According to one aspect of the disclosure, a method is provided comprising: detecting, by an electronic device, current context information of the electronic device; comparing the current context information with prestored context information; and outputting an indication of a recommended contact and a preferred communication channel for reaching the recommended contact, wherein the indication is output based on the prestored context information matching the current context information.

According to another aspect of the disclosure, an electronic device is provided comprising a processor configured to: detect current context information of the electronic device; compare the current context information with prestored context information; and output an indication of a recommended contact and a preferred communication channel for reaching the recommended contact, wherein the indication is output based on the prestored context information matching the current context information.

According to another aspect of the disclosure, a method for providing a contact address based on context information in an electronic device, comprising: displaying an indication of a recommended contact and a preferred communication channel for reaching the recommended contact, wherein the indication is output based on context information related to the electronic device; detecting a selection of the recommended contact and the preferred communication channel; and establishing a connection with the recommended contact over the preferred communications channel.

BRIEF DESCRIPTION OF THE DRAWINGS

The above and other objects, features and advantages of the present disclosure will become more apparent from the following detailed description when taken in conjunction with the accompanying drawings in which.

DETAILED DESCRIPTION ASPECT

Examples of the present disclosure will be described herein below with reference to the accompanying drawings. In the following description, detailed descriptions of well-known functions or configurations will be omitted since they would unnecessarily obscure the subject matter of the present disclosure. Also, the terms used herein are defined according to the functions of the present disclosure. Thus, the terms may vary depending on users' or operators' intentions or practices. Therefore, the terms used herein should be understood based on the descriptions made herein.

Figure 1A:
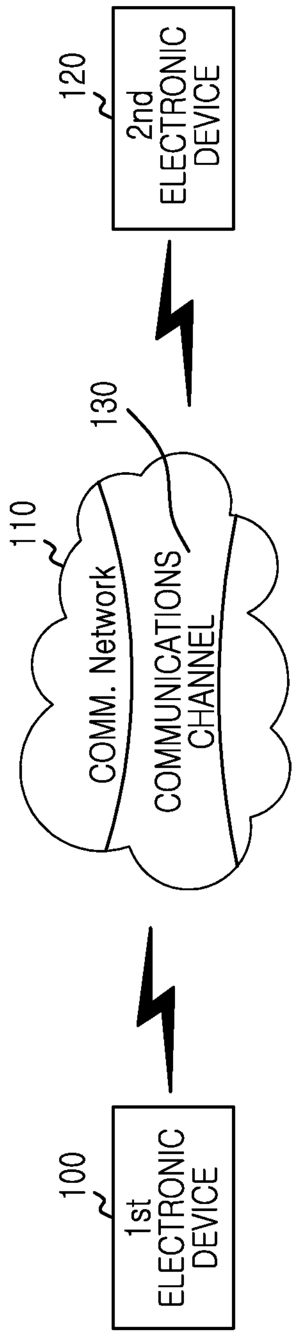
FIG. 1A is a diagram of an example of a communications system.

FIG. 1A is a diagram of an example of a communications system. The system includes a first electronic device 100 a communications network 110 and a second electronic device 120. In operation, the electronic device 100 of a first user may attempt to connect with the electronic device 120 of a second user through a network 110 by using a communication channel 130. The communication channel 130 may be one of a social networking service (SNS), a mobile phone, a home phone, a business phone, a short message service (SMS), and a multimedia message service (MMS). The network 110 may support a resource for constructing the communication channel 130. Also a contact address may be used in establishing the communications channel. The contact address may be used any suitable set of one or more identifiers that are used in establishing the communications channel 130 and/or the connection between the electronic device 100 and the electronic device 120.

Examples of the electronic device 100 or 120 may include portable terminals, mobile terminals, mobile pads, media players, tablet computers, handheld computers, personal digital assistants (PDAs), servers, and personal computers (PCs). Also, the electronic device 100 or 120 may be any other suitable type of electronic device.

Figure 1B:
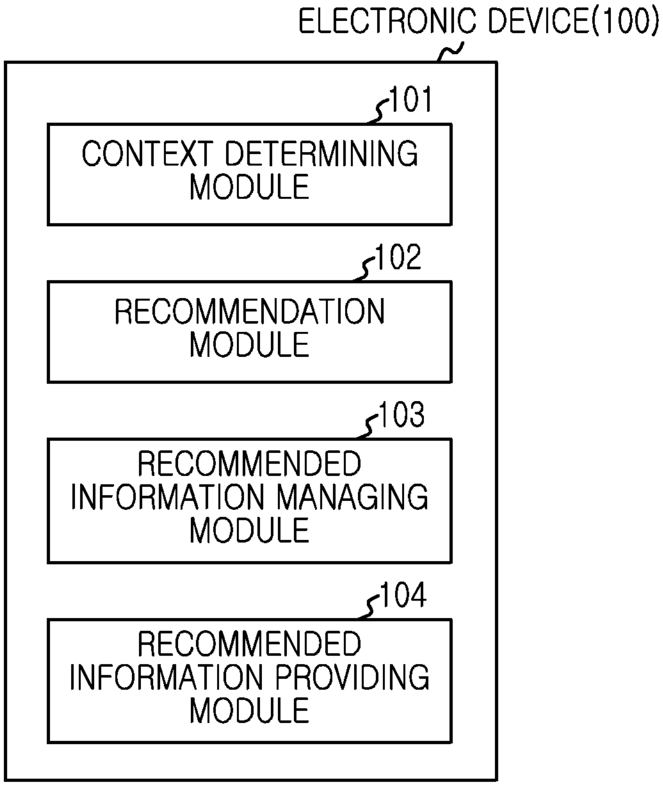
FIG. 1B is a block diagram illustrating an example of the operation of the electronic device 100.

FIG. 1B is a block diagram illustrating an example of the operation of the electronic device 100. A context determining module 101 analyzes and determines log information or the context information (e.g., time, place, weather, or schedule) of the electronic device 100 to detect a particular context of the electronic device 100. The context determining module 101 determines a context based on a similarity between prestored context condition and collected context information. A recommendation module 102 identifies a contact based on the specific context, and recommends a communication channel for reaching the identified contact by using context information or log information. The contact may be any person or entity identified in an address book, a contacts list, or another similar structure associated with the electronic device 100. A recommended information managing module 103 stores selected contact information, recommended communication channel information about each selected contact, and context information in an internal memory, or transmits the information to a server and stores the same in the server. A recommended information providing module 104 provides a recommended contact or communication channel to the user electronic device 100 according to a particular condition or a user selection, and enables communication with the electronic device 120 when the communication channel 130 is established. Each of the modules described herein may be configured by software, hardware, or a combination thereof. For example, one or more of the modules may include a processor, a Field Programmable Gate Array (FPGA), an Application Specific Integrated Circuit (ASIC), and/or any suitable type of processing circuitry. Also, some of the modules may be integrated together into a single module. Also, the respective modules may further perform other functions in addition to the above-described functions.

According to aspects of the disclosure, the context information may include at least one of the current position and time of the electronic device 100. Additionally or alternatively, according to aspects of the disclosure, the log information may include at least one of contact identification information, a call time, a call start time, a call end time, call channel identification information, call place information, and outgoing/incoming call information.

When the context information of the electronic device 100 is identical to or similar to prestored context information, the electronic device 100 displays a recommended contact (e.g., a user of the electronic device 120) or communication channel for reaching the contact, which is mapped to the context information. When a communication channel of a particular contact is selected, the electronic device 100 attempts to connect with the electronic device 120 through the selected communication channel.

Figure 2:
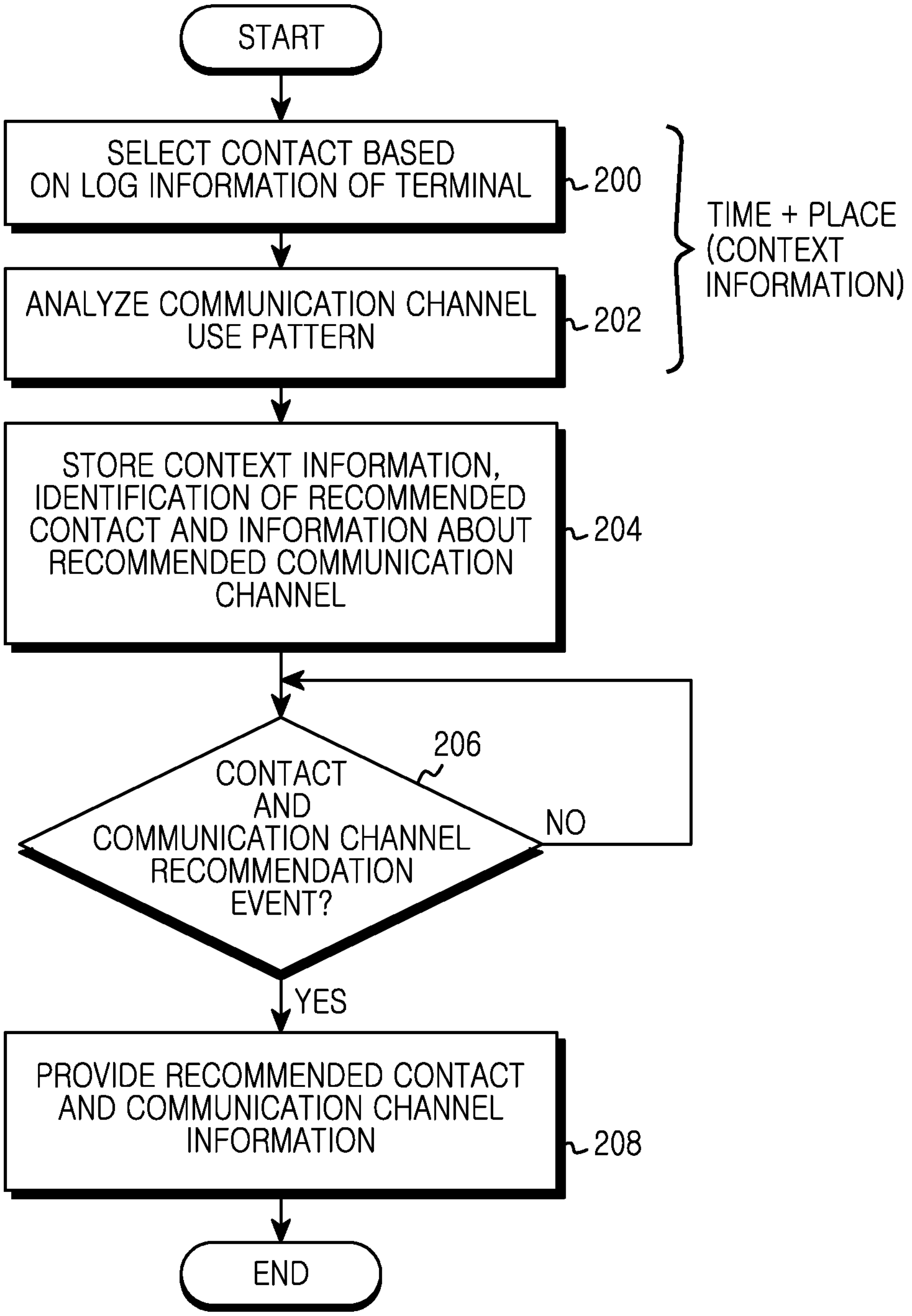
FIG. 2 is a flowchart of an example of a process according to aspects of the present disclosure.

FIG. 2 is a flowchart of an example of a process according to aspects of the present disclosure. Referring to FIG. 2, in step 200, the recommendation module 102 of the electronic device 100 may select a recommended contact in an address book (e.g., a phone book or a telephone directory) by using log information including a communications history log. For example, the recommendation module 102 calculates a score for each contact in the address book (phone book or telephone directory) by using the log information including the communications history, sorts the scores of respective contacts in a descending or ascending order, and selects a predetermined number of contacts whose scores meet a threshold. The address book (phone book or telephone directory) may be stored in an internal memory (704 in FIG. 7) or an extended memory (770 in FIG. 7) of the electronic device 100, or may be stored in a server.

The context information used in scoring the contacts may include at least one of time, place, weather information, and schedule information. Thus, the log information including the communications history may include at least one of an identifier for reaching a particular contact over a given communications channel (e.g., phone number, e-mail ID, and SNS account ID), a call start time, a call end time, an identification of a channel, location where a communication was conducted, and outgoing/incoming call information.

When an analysis is performed based on time information, scoring may be performed by applying weights based on various factors (e.g., transmission/reception) related to communication channels and communication channel types, in order to determine whether a contact corresponding to a contact is an important contact.

For example, the importance of a contact may vary according to the importance of each communication channel and the call pattern of each communication channel. For example, in a case where the user communicates with a first contact ten times through e-mail in a particular time period and communicates with a second contact via telephone two times, since the telephone call is regarded as a more familiar communication means than the e-mail, the second contact may be considered as a more important contact than the first contact although the number of times of using the communication channel for the second contact is smaller than the number of times of using the communication channel for the first contact.

As another example, in a case where the user receives an incoming call from a first contact ten times in a particular time period and makes an outgoing call to a second contact eight times and receives an incoming call from the second contact two times, since the outgoing call is regarded as more important than the incoming call, the second contact may be considered as a more important contact than the first contact although the number of times the user has communicated with the second contact is smaller than the number of times the user has communicated with the first contact.

As another example, in a case where the user receives a call from a first contact ten times for about five minutes on average and receives a call from a second contact three times for about one hour on average, since the average call time for the second contact is longer than the average call time for the first contact, the second contact may be considered as a more important contact than the first contact although fewer phone calls have been conducted with the second contact than with the first contact.

For example, according to aspects of the disclosure, the communications history of a user of the electronic device 100 with respect to various other users may be analyzed as illustrated in Table 1 below:

TABLE 1

| | Call (duration) | | SMS (#) | | Email(#) | | Messenger(#) | | | total based |
|---|---|---|---|---|---|---|---|---|---|---|
| type | receive | send | receive | send | receive | send | receive | send | sum | on weights |
| weights | 2.3 | 5.3 | 1 | 1.9 | 1 | 1.9 | 0.5 | 0.9 | | |
| Contact A | 5 | 6.1 | 20 | 10 | 50 | 10 | 100 | 67 | 268.1 | 262.13 |
| Contact B | 2.4 | 7.2 | 52 | 42 | 53 | 22 | 42 | 40 | 260.6 | 327.28 |
| Contact C | 4.1 | 2.5 | 3 | 43 | 32 | 32 | 56 | 23 | 195.6 | 248.88 |

As illustrated in Table 1, the total time of incoming calls between the electronic device 100 and contact A is 5 hours, the total time of outgoing calls between the electronic device and contact A is 6.1 hours. In addition, 20 Short Messaging Service (SMS) messages are received by the electronic device 100 from contact A and 10 SMS messages are transmitted to contact A by the electronic device 100. In addition, 50 emails are received by the electronic device 100 from contact A and 10 emails are transmitted by the electronic device to contact A. And finally, in this example, 100 messenger messages are received by the electronic device 100 from contact A and 67 messenger messages are transmitted by the electronic device 100 to contact A. The communications history of the electronic device with contacts B and C may be interpreted in the same manner.

According to aspects of the disclosure, the metrics identified in Table 1 (and/or other metrics used) may be weighted. In some implementations, the metrics may be weighted according to a type of channel the metrics represent and direction. For example, when weights are applied to respective communication channels in the ratio of 5:2:2:1 and weights are applied to reception and transmission factors in the ratio of 3:7, the weighted values shown in Table 1 may be calculated. After the weights are factored in, a weighted score may be calculated for each contact. The weighted scores then may be used to select a recommended contact. For example, and without limitation, the contact having the highest score may be recommended.

Additionally or alternatively, according to aspects of the disclosure, in the case of a communication medium such as a text message, an e-mail, or a messenger, in which contents exchanged with a contact are stored, the contents may be analyzed while excluding information for example meaningless to the user by filtering the contents. For example, although the user frequently receives a credit card acknowledgement message, if the sender of the message is selected as a recommended contact, this may be meaningless recommendation. Thus, undesirable contacts may be filtered off based on a particular word or a particular text length of communications exchanged with these contacts by the electronic device 100. Thus, in some implementations, contacts may be selected for recommendation based on a content analysis of past communications between the electronic device 100 and the contacts.

In step 202, the recommendation module 102 of the electronic device 100 selects a preferred communications channel for conducting communications with the selected contact. For example, based on the selected contact, the recommendation module 102 of the electronic device 100 may analyze which communication channel to recommend to the user. As in step 200, a determination may be made by applying a weight to each available channel. The weight may be determined based on the number of times the channel is used for the conduct of communications between the electronic device 100 and the selected contact. Additionally or alternatively, the weight may be based on the type of the communications channel (e.g., telephone, email, SMS, etc.)

For example, in a case where the user of the electronic device 100 conducts ten telephone calls with a given contact, while also exchanging 10 SMS messages with that contact, since the telephone call is more important than the messenger, a communication channel for a telephone call may be recommended as a connection means with the contact of the contact later.

In step 204, the electronic device may store the results of the analysis performed in steps 200 and 202 in memory. For example, storing the results of the analyses may include storing an indication of the selected contact and preferred contact channel. Additionally or alternatively, storing the results of the analyses, may include storing in memory a data structure, such as that illustrated with respect to Table 1, that identifies various metrics for different contacts (or communication channels), weights for those metrics, and final scores corresponding to the different contacts (or communications channels). This information may be stored in the electronic device 100 or a remote server according to a user setting. For example, since information about a communication channel with a contact is personal information, the user may be reluctant to store the information in an external space such as the server. In this case, the information may be stored in the internal memory. On the other hand, in a case where the log information of the user is accumulated more than a predefined critical value, in order to make a more accurate analysis and perform correct recommendation, the information may be stored in the server that may rapidly store and process a large amount of data.

Additionally or alternatively, in some instances, after the results of the analysis of the communications history of the electronic device 100 are stored, information about the current context of the electronic device 100 may be additionally applied in order to select a recommended contact and/or communications channel. For example, the importance degree of a communication channel may vary according to the current position and time information of the user. For example, when the user is at home, if the instant use of an e-mail is relatively difficult, the importance degree of an e-mail as a communication channel for connection with a contact may decrease greatly. On the other hand, when the user is in his/her office, the importance degree of an e-mail as a communication channel for connection with a contact may increase. According to aspects, the importance degree of a place may vary according to whether contact information is a business member or a family member. For example, in the office of the user of the electronic device 100, the importance degree of a telephone call with a business member may be higher than the importance degree of a telephone call with a family member; and at home, the importance degree of a telephone call with a family member may be higher than the importance degree of a telephone call with a business member.

In this manner, when the analysis result (e.g., a recommended contact and a communication channel of the recommended contact) and the context information of a user terminal may be mapped to each other and stored in the server or the terminal.

When a contact or communication channel recommendation event occurs (e.g. when a current context information is identical to or similar to a prestored context information) in step 206, the recommended information providing module 104 of the electronic device 100 proceeds to step 208 and provides a recommended contact and information about a communication channel of the recommended contact based on the current context information of the user at the time when the channel recommendation event has occurred.

Additionally or alternatively, in some instances, different contacts and/or contact channels may be mapped to different sets of prestored contact information. In such instances, the electronic device 100 periodically detects the current context information, compares the current context information with prestored context information, and identifies a recommended contact mapped to the prestored context information and a recommended communication channel of the contact when the current context information is identical to or similar to the prestored context information. Thus, in this example, the electronic device 100 may continuously update a recommended indication that is displayed on the device's display screen.

In addition, as another example, a contact and a communication channel may be recommended in consideration of the current connectivity state and/or, current sound output profile of the electronic device 100, availability of the contact on the communication channel. When the electronic device 100 is connected to a WiFi network, a VoIP voice call (rather than a general voice call) may be recommended. When the user is in a movie theater or a conference room or the terminal corresponding to the user is in a mute mode, a messenger or an e-mail suitable for the mute mode may be recommended even if the first priority of a communication channel of a recommended contact is a telephone call. Also, when the contact logs out the e-mail or the messenger, the next-priority communication channel may be recommended.

Stated succinctly according to one example, selecting one or more contacts from the address book of the electronic device 200 may include: determining a weight with respect to each communication channel; analyzing a per-communication channel use pattern based on the log information; scoring each contact in the address book according to a per-communication channel weight and a per-communication channel use pattern; performing an ascending sort or a descending sort according to the scores of the contacts; and selecting one or more contacts having the highest (or lowest) scores.

Figure 3:
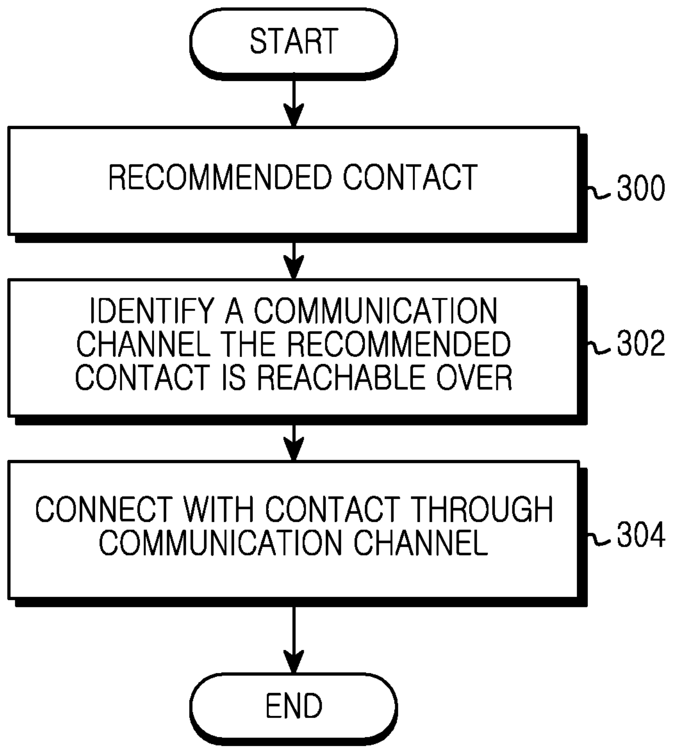
FIG. 3 is a flowchart of another example of a process according to aspects of the present disclosure.
Figures 4A, 4B, 4C:
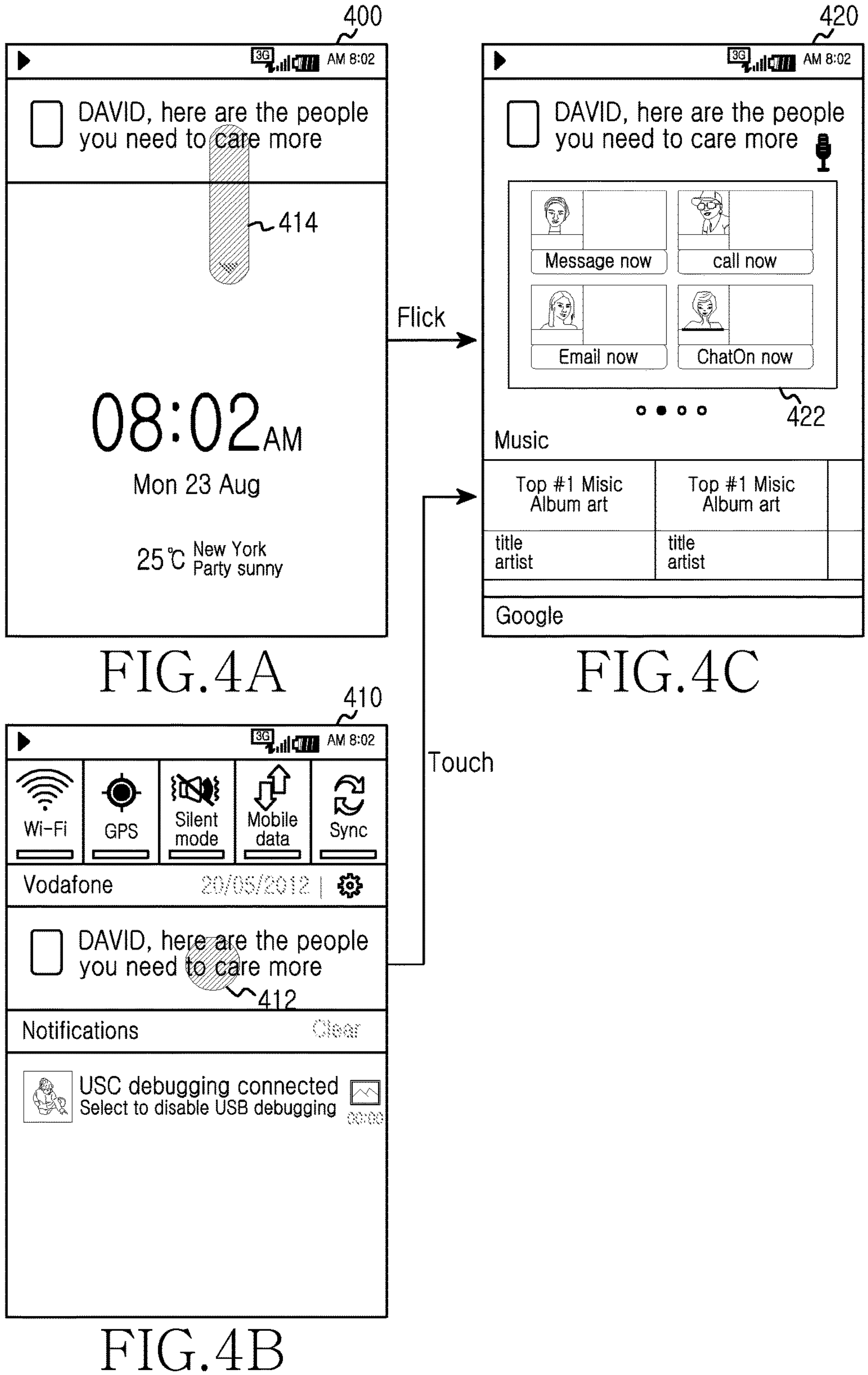
FIG. 4A, FIG. 4B and FIG. 4C are diagrams illustrating an example of user interface (UI) screens for recommending a communication channel or a contact address based on context information according aspects of the disclosure.

FIG. 3 is a flowchart of another example of a process according to aspects of the present disclosure. Referring to FIG. 3, in step 300, the electronic device 100 periodically detects current context information, and identifies the existence of a recommended contact and a recommended communication channel for the contact when the current context information is identical to or similar to prestored context information. For example, as illustrated in FIGS. 4A and 4B, the electronic device 100 may indicate the existence of a recommended contact or a recommended communication channel of the contact, at an upper end of a lock screen or a notification bar in the form of a ticker. According to another aspect, when an application is being executed, the electronic device 100 may provide the recommended contact and information about the recommended communication channel of the contact through a flick-up gesture at a lower end of the application.

Thereafter, in step 302, when detecting a gesture of touching a notification message at the upper end of the lock screen and dragging the same downward or a gesture of tapping or touching the notification message (hereinafter referred to as a tap gesture), or when receiving a voice command or a particular input through other sensors, the electronic device 100 may provide a recommended contact mapped to the prestored context information and information about a recommended communication channel of the contact (see FIG. 4C).

Figures 5A, 5B, 5C:
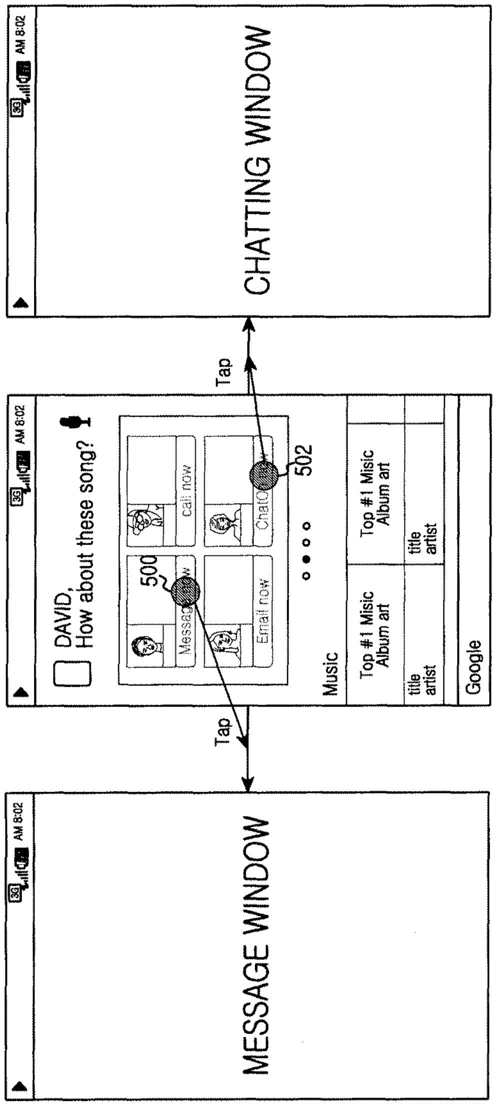
FIG. 5A, FIG. 5B and FIG. 5C are diagrams illustrating another example of UI screens according to an aspect of the present disclosure.

Thereafter, in step 304, when detecting a touch for selecting a communication channel of a contact, the electronic device 100 connects to the recommended contact via the recommended communications channel (see FIGS. 5A to 5C).

Additionally or alternatively, in some aspects, the above method may further include: selecting one or more contacts from the address book in consideration of at least one of the predefined context information and the log information; analyzing a per-communication channel use pattern of each of the selected contacts and selecting a communication channel; and storing the selected contact or the selected communication channel in association with the predefined context information.

According to various aspects, the operations described herein may be executed sequentially or in parallel, may be executed heuristically, or may be repeated; or some of the operations may be omitted or the operations may be executed in various manners.

FIGS. 4A to 4C are diagrams illustrating an example of user interface (UI) screens for recommending a communication channel or a contact based on context information according aspects of the disclosure.

Referring to FIG. 4A, the existence of a recommended contact or communication channel is indicated at an upper end of a lock screen 400 or a notification bar in the form of a ticker. For example, based on the current context information, a notification message is provided to identify of one or more contacts that could be of interest to the user of the electronic device 100. In this case, when the notification message is dragged downward (414), the notification message is touched, or the notification message is tapped, a communication channel (422) is provided together with a recommended contact mapped to the context information, as illustrated in FIG. 4C (420). In this example, four contacts are identified. The identified contacts may be determined based on ranking scores calculated in accordance with the processes discussed with respect to FIGS. 2 and 3. Additionally or alternatively, in some implementations, the identified contacts may be the ones having the highest (or lowest) ranking scores.

Referring to FIG. 4B, a notification message is provided in screen 410 to identify a person that could be of interest to the user of the electronic device 100. In this example, the notification message may be provided in a screen including a notification bar for notifying whether WiFi, Bluetooth, GPS, a mute mode, or automatic rotation is activated or deactivated. In this case, when the notification message is touched, the notification message is tapped, or a voice input or another sensor input is received, a communication channel (422) is provided together with a recommended contact mapped to the context information, as illustrated in FIG. 4C (420).

FIGS. 5A to 5C are diagrams illustrating another example of UI screens according to aspects of the disclosure. FIG. 5A illustrates an example in which information about a recommended contact and communication channel is provided. In this case, when the recommended communication channel of the contact is touched, a screen corresponding to the touched communication channel is displayed. For example, when a communication channel of a first recommended contact is a message, a message transmission screen is displayed as illustrated in FIG. 5B; and when a communication channel of a second recommended contact is chatting, a chatting screen is displayed as illustrated in FIG. 5C.

Figure 6:
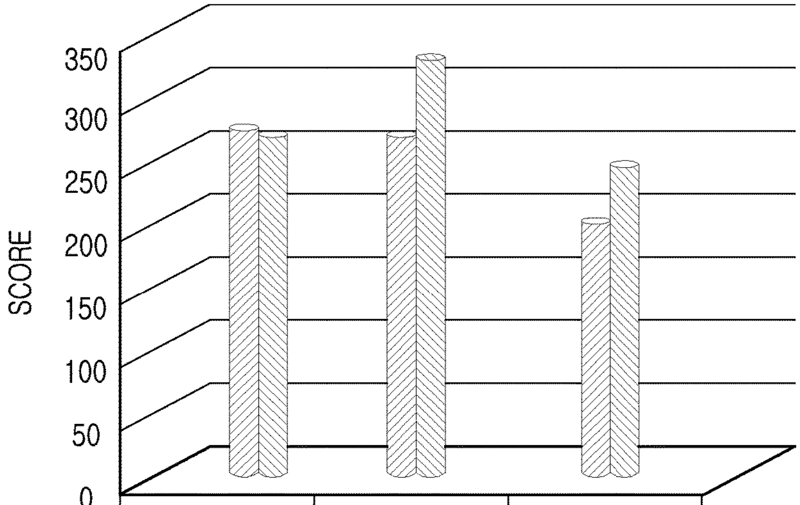
FIG. 6 is an example of a graph illustrating the analysis result of Table 1.

FIG. 6 is an example of a graph illustrating a score of each contact depending on a user communication pattern according to aspects of the present disclosure.

FIG. 6 is an example of a graph illustrating the analysis result of Table 1.

Figure 7:
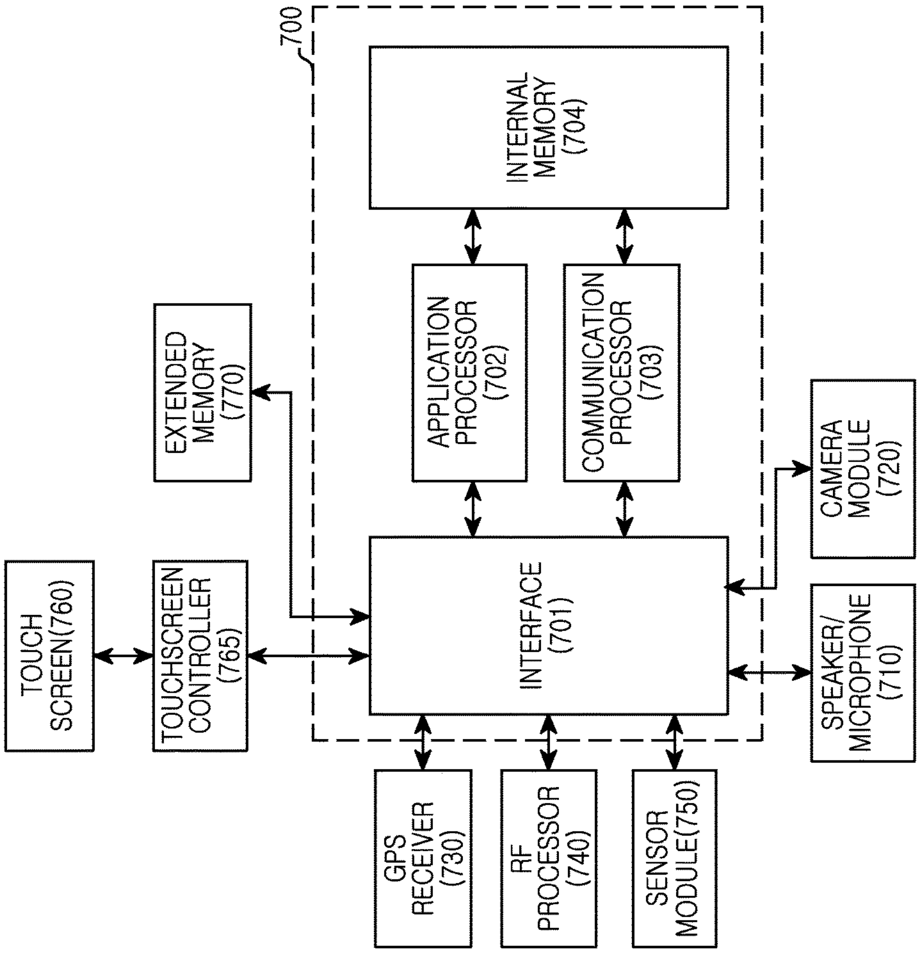
FIG. 7 is a diagram of an example of the configuration of the electronic device 100 according to an aspect of the present disclosure.

FIG. 7 is a diagram of an example of the configuration of the electronic device 100 according to an aspect of the present disclosure.

Referring to FIG. 7, the electronic device includes a controller 700, a speaker/microphone 710, a camera module 720, a Global Positioning System (GPS) receiver 730, a Radio Frequency (RF) processor 740, a sensor module 750, a touchscreen 760, a touchscreen controller 765, and an extended memory 770.

The controller 700 may include an interface 701, one or more processors 702 and 703, and an internal memory 704. Additionally or alternatively, the controller may include an ASIC, and FPGA, and/or any other suitable type of processing circuitry. In some cases, the controller 700 may also be referred to as a processor. The interface 701, the application processor 702, the communication processor 703, and the internal memory 704 may be separate units, or may be integrated on one or more integrated circuits.

The application processor 702 executes various software programs to perform various functions for the electronic device, and the communication processor 703 performs processes and controls for voice communication and data communication. In addition to these general functions, the processors 702 and 703 execute a software module (instruction set) stored in the extended memory 770 or the internal memory 704 and perform various functions corresponding to the software module. For example, the processors 702 and 703 perform the methods of providing a communication channel and a contact based on context information according to the aspects of the present disclosure, in cooperation with software modules stored in the extended memory 770 or the internal memory 704.

For example, the application processor 702 selects a recommended contact from an address book or a telephone directory of the electronic device 100 by using log information. The log information may include a communications history log of the electronic device 100. For example, the application processor 702 scores each contact in the address book (phone book or telephone directory) by using the log information including the communications history, sorts the scores of respective contacts in a descending or ascending order, and selects a predetermined number of contacts having high scores. When the contacts are scored, important context information is a time and a place of communications between the electronic device and the contacts. Thus, the log information including the communications history may include contact information (e.g., phone number, e-mail ID, and SNS account ID), a call time, a call start time, a call end time, call channel identification information, call place information, and outgoing/incoming call information. When an analysis is performed based on time information, scoring may be performed by applying weights based on various factors (e.g., transmission/reception) related to communication channels and communication channel types, in order to determine whether a contact corresponding to a contact is an important contact.

Also, the application processor 720 analyzes a communication use pattern between users of selected contacts. For example, the application processor 720 analyzes which communication channel to recommend to the user, based on the selected contact, stores selected contact information, recommended communication channel information about each selected contact, and context information in the internal memory, or transmits the information to the server and stores the same in the server. On the other hand, when the analysis result is stored, the context information may be additionally applied.

Also, when a contact or communication channel recommendation event occurs, the application processor 702 provides a recommended contact and information about a communication channel of the contact based on the current context information of the user. For example, the application processor 702 periodically detects the current context information, compares the current context information with prestored context information, and notifies a recommended contact mapped to the prestored context information and a recommended communication channel of the contact when the current context information is identical to or similar to the prestored context information. In addition, a contact and a communication channel may be recommended in consideration of the context information of the terminal.

Other processors (not illustrated) may include at least one data processor, image processor, or codec. The data processor, the image processor, or the codec may be configured separately. Also, the processor may be configured by a plurality of processors performing different functions. The interface 701 is connected to the touchscreen controller 765 and the extended memory 770 of the electronic device.

The sensor module 750 may be connected to the interface 701 to perform various functions. For example, a motion sensor and an optical sensor may be connected to the interface 701 to detect a motion of the electronic device and detect light from the outside. In addition, other sensors such as a position measuring system, a temperature sensor, and a biosensor may be connected to the interface 750 to perform relevant functions.

The camera module 720 may be connected through the interface 701 to the sensor module 750 to perform camera functions such as photographing and video clip recording.

The RF processor 740 performs communication functions. For example, under the control of the communication processor 703, the RF processor 940 converts an RF signal into a baseband signal and provides the same to the communication processor 703, or converts a baseband signal from the communication processor 703 into an RF signal prior to transmission. Herein, the communication processor 703 processes baseband signals according to various communication schemes. For example, the communication schemes may include, but not limited to, a GSM (Global System for Mobile Communication) communication scheme, an EDGE (Enhanced Data GSM Environment) communication scheme, a CDMA (Code Division Multiple Access) communication scheme, a W-CDMA (W-Code Division Multiple Access) communication scheme, an LTE (Long Term Evolution) communication scheme, an OFDMA (Orthogonal Frequency Division Multiple Access) communication scheme, a WiFi (Wireless Fidelity) communication scheme, a WiMax communication scheme, and/or a Bluetooth communication scheme.

The speaker/microphone 710 may perform audio stream input/output such as voice recognition, voice replication, digital recording, and phone functions. For example, the speaker/microphone 710 converts a voice signal into an electrical signal or coverts an electrical signal into a voice signal. Although not illustrated, an attachable/detachable earphone, a headphone, or a headset may be connected through an external port to the electronic device.

The touchscreen controller 765 may be connected to the touchscreen 760. For example, the touchscreen 760 and the touchscreen controller 765 may detect a touch, a motion, or a stop thereof by using multi-touch detection technologies including a proximity sensor array or other elements, as well as capacitive, resistive, infrared and surface acoustic wave technologies for determining one or more touch points with the touchscreen 760.

The touchscreen 760 provides an input/output interface between the electronic device and the user. For example, the touchscreen 760 transmits a user touch input to the electronic device. Also, the touchscreen 960 is a medium that displays the output from the electronic device to the user. For example, the touchscreen 960 displays a visual output to the user. The visual output may be represented by a text, a graphic, a video, or a combination thereof.

The touchscreen 760 may use various display technologies. For example, the touchscreen 280 may use an LCD (liquid crystal display), an LED (Light Emitting Diode), an LPD (light emitting polymer display), an OLED (Organic Light Emitting Diode), an AMOLED (Active Matrix Organic Light Emitting Diode), or an FLED (Flexible LED).

The GPS receiver 730 converts signals received from satellites into information such as position, speed and time. For example, the distance between a satellite and the GPS receiver is calculated by multiplying the velocity of light by a signal arrival time, and the position of the electronic device is measured by triangulation by obtaining the accurate positions and distances of three satellites.

The extended memory 770 or the internal memory 704 may include one or more high-speed random-access memories (RAMs) such as magnetic disk storage devices, one more nonvolatile memories, one or more optical storage devices, and/or one or more flash memories (for example, NAND flash memories or NOR flash memories).

The extended memory 770 or the internal memory 704 stores software. Elements of the software include an operation system (OS) software module, a communication software module, a graphic software module, a user interface (UI) software module, an MPEG module, a camera software module, and one or more application software modules. Since the module for example an element of the software may be represented as a set of instructions, the module may be referred to as an instruction set. The module may also be referred to as a program.

The OS software includes various software elements for controlling general system operations. For example, control of the general system operation includes memory control/management, storage hardware (device) control/management, and power control/management. The OS software also performs a function for enabling smooth communication between various hardware elements (devices) and software elements (modules).

The communication software module may enable communication with other electronic devices (such as computers, servers, and/or portable terminals) through the RF processor 740. The communication software module includes a protocol structure corresponding to a relevant communication scheme.

The graphic software module includes various software elements for providing and displaying graphics on the touchscreen 760. The graphics include texts, web pages, icons, digital images, videos, and animations.

The UI software module includes various software elements related to a user interface. The UI module includes information about how the state of a user interface changes or information about under what condition the state of a user interface changes.

The camera software module includes camera-related software elements that enable camera-related processes and functions. The application module includes a web browser including a rendering engine, an e-mail application, an instant message application, a word processing application, a keyboard emulation application, an address book application, a touch list application, a widget application, a digital right management (DRM) application, a voice recognition application, a voice replication application, a position determining function application, a location-based service (LBS) application, and the like. The memories 770 and 704 may further include an additional module (instructions) in addition to the above-described modules. Also, in some cases, some of the modules (instructions) may not be used. In addition to the present disclosure, the web browser includes an execution button and a selection menu for controlling a display of objects that change dynamically in a web page.

According to the present disclosure, the application module may include processor-executable instructions for providing a communication channel or contact based on context information (see FIGS. 2 and 3).

For example, the application module may include processor executable instructions for selecting a recommended contact from a phone book or a telephone directory by using log information including a communications history. For example, the application module may score each contact in the address book (phone book or telephone directory) by using the log information including the communications history, sort the scores of respective contacts in a descending or ascending order, and select a predetermined number of contacts having high scores. When the contacts are scored, important context information may include a time and a place of past communications between the electronic device 100 and the contacts. The log information including the communications history may include an identifier for reaching a particular contact on a given communications channel (e.g., phone number, e-mail ID, and SNS account ID), a call time, a call start time, a call end time, call channel identification information, call place information, and outgoing/incoming call information. When an analysis is performed based on time information, scoring may be performed by applying weights based on various factors (e.g., transmission/reception) related to communication channels and communication channel types, in order to determine whether a contact corresponding to a contact is an important contact.

Also, the application module may include processor-executable instructions for analyzing a communication channel use pattern between users of selected contacts. For example, the application module may analyze which communication channel to recommend to the user based on the selected contact. In addition, the application module may store selected contact information, recommended communication channel information about each selected contact, and context information in the internal memory, or transmits the information to the server and stores the same in the server. In some implementations, when the analysis result is stored, the context information may be additionally applied.

Also, the application module may include processor-executable instructions for providing a recommended contact and information about a communication channel of the contact based on the current context information of the user when a contact or communication channel recommendation event occurs. For example, the application module may periodically detect the current context information, compare the current context information with prestored context information, and identify a recommended contact mapped to the prestored context information and a recommended communication channel of the contact when the current context information is identical to or similar to the prestored context information.

Also, various functions of the electronic device according to the present disclosure, which have been described above and will be described below, may be implemented by any combination of hardware and/or software including one or more processings and/or an application-specific integrated circuit (ASIC).

Figure 8:
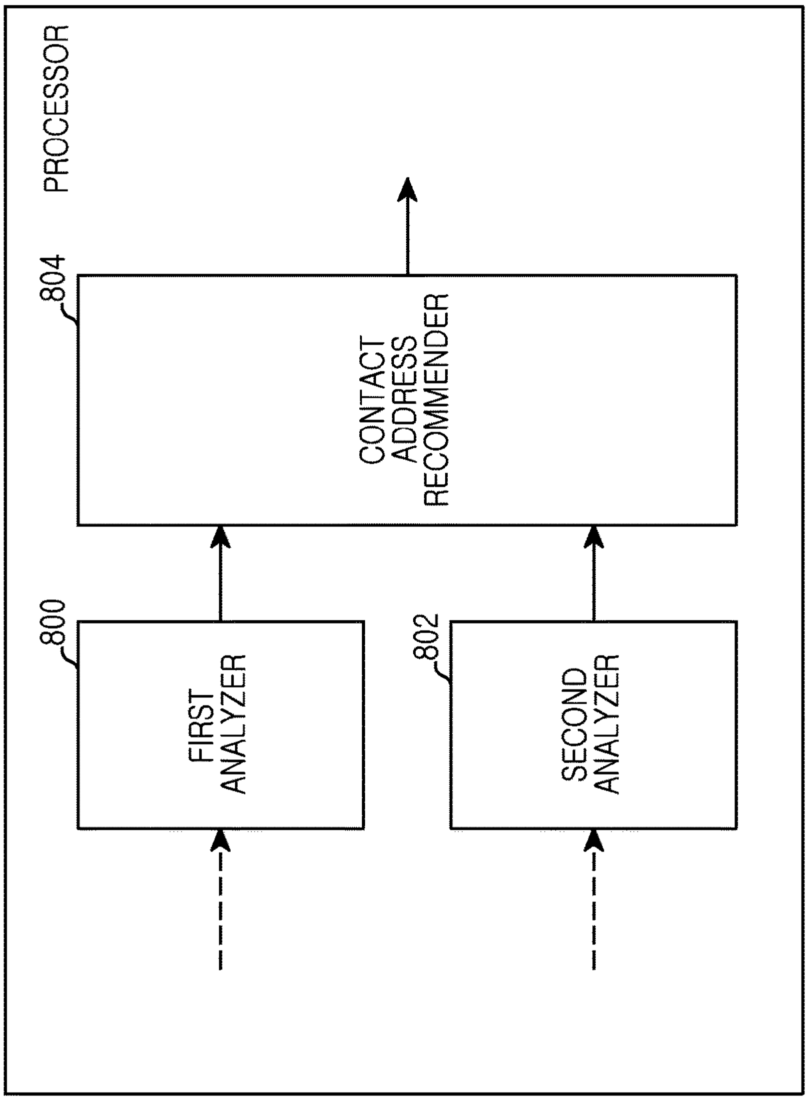
FIG. 8 is a diagram of an example of the recommendation module 102 of the electronic device 100 according to aspects of the present disclosure.

FIG. 8 is a diagram of an example of the recommendation module 102 of the electronic device 100 according to aspects of the present disclosure. FIG. 8 illustrates an aspect of an internal operation of the recommendation module 102 for providing a communication channel or a contact based on context information. The recommendation module 102 may include a first analyzer 800, a second analyzer 802, and a contact recommender 804. Each of the analyzers 800 and 802 may be implemented by using one or more processors and or any other suitable type of processing circuitry.

The first analyzer 800 selects a recommended contact from a phone book or a telephone directory by using log information including a communications history. For example, the first analyzer scores each contact in the address book (phone book or telephone directory) by using the log information including the communications history, sorts the scores of respective contacts in a descending or ascending order, and selects a predetermined number of contacts having high scores.

When the contacts are scored, important context information may include a time and a place of past communications between the electronic device 100 and the contacts. Thus, the log information including the communications history may include contact information (e.g., phone number, e-mail ID, and SNS account ID), a call time, a call start time, a call end time, call channel identification information, call place information, and outgoing/incoming call information.

When an analysis is performed based on time information, scoring is performed by applying weights based on various metrics related to communication channels and communication channel types, in order to determine whether a contact corresponding to a contact is an important contact.

For example, the importance of a contact may vary according to the importance of each communication channel and the pattern at which each communication channel is used for communications between the electronic device 100 and the contact. For example, in a case where the user of the electronic device 100 exchanges ten emails with first content, while conducting only two telephone calls with a second contact, since the telephone call is regarded as a more familiar communication means than the e-mail, the second contact may be considered to be more important despite the fact that there are more communications performed with the first contact.

The second analyzer 802 analyzes a communication channel use pattern for one or more selected contacts. For example, based on a selected contact, the second analyzer 802 analyzes which communication channel to recommend to the user for reaching the selected contact(s). For example, a determination may be made by applying a per-communication channel weight based on the number of times of communication and a communication medium. For example, in a case where the user of electronic device 100 has conducted 10 telephone calls and exchanged 10 SMS messages with a given contact, since telephony may be considered a more important communications channel than SMS messaging, a telephone call communications channel may be recommended for conducting communications with the recommended contact.

The contact recommender 804 stores selected contact information, recommended communication channel information about each selected contact, and context information in the internal memory, or transmits the information to the server and stores the same in the server. In some implementations, the importance degree of a communication channel may vary according to the current position and time information of the user. For example, when the user is at home, if the instant use of an e-mail is relatively difficult, the importance degree of an e-mail as a communication channel for connection with a contact may decrease greatly. On the other hand, when the user is in an office, the importance degree of an e-mail as a communication channel for connection with a contact may increase. According to aspects of the disclosure, the importance degree of a place may vary according to whether a contact is classified as a "business contact" or a "family member" contact. For example, in the office of the user of the electronic device 100, the importance degree of a telephone call with a business member may be higher than the importance degree of a telephone call with a family member; and at home, the importance degree of a telephone call with a family member may be higher than the importance degree of a telephone call with a business member.

Additionally or alternatively, when a contact or communication channel recommendation event occurs, the contact recommender 804 provides a recommended contact and information about a communication channel of the contact based on the current context information of the user. For example, the contact recommender 804 periodically detects the current context information, compares the current context information with prestored context information, and notifies a recommended contact mapped to the prestored context information and a recommended communication channel of the contact when the current context information is identical to or similar to the prestored context information.

In addition, a contact and a communication channel may be recommended in consideration of current connectivity state and/or, current sound output profile of the electronic device 100, availability of the contact on the communication channel. When the electronic device is connected to a WiFi network, a VoIP voice call (rather than a general voice call) may be recommended. When the user is in a movie theater or a conference room or the terminal corresponding to the user is in a mute mode, a messenger or an e-mail suitable for the mute mode may be recommended even if the first priority of a communication channel of a recommended contact is a telephone call. Also, when the contact logs out the e-mail or the messenger, the next-priority communication channel may be recommended.

According to various aspects of the present disclosure, the communication channel or the contact is provided based on the context information. Accordingly, a person attempting to contact another person may quantitatively or qualitatively determine which communication channel is most effective, and a time for the user to attempt communication by using each communication channel may be minimized.

It should be noted that FIGS. 2-3 are provided as examples only. At least some of the steps discussed with respect to those figures may be performed in a different order, performed concurrently, or altogether omitted.

The above-described aspects of the present disclosure can be implemented in hardware, firmware or via the execution of software or computer code that can be stored in a recording medium such as a CD ROM, a Digital Versatile Disc (DVD), a magnetic tape, a RAM, a floppy disk, a hard disk, or a magneto-optical disk or computer code downloaded over a network originally stored on a remote recording medium or a non-transitory machine readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase “means for”.

While the disclosure has been shown and described with reference to certain exemplary aspects thereof, it will be understood by those skilled in the art that various changes in form and details may be made therein without departing from the spirit and scope of the disclosure as defined by the appended claims. Therefore, the scope of the disclosure is defined not by the detailed description of the disclosure but by the appended claims, and all differences within the scope will be construed as being included in the present disclosure.

What is claimed is:

1. A method in an electronic device, the method comprising:

detecting current context information of the electronic device;

determining, based on the current context information, a recommended contact and a preferred communication channel type;

determining whether a notification mode of the electronic device is a mute mode;

when the notification mode of the electronic device is the mute mode, changing the preferred communication channel type to a communication channel type corresponding to the mute mode; displaying the recommended contact and the communication channel type corresponding to the mute mode;

detecting an input for selecting the recommended contact and the communication channel type corresponding to the mute mode; and in response to detecting the input, automatically establishing a connection with the recommended contact over the communications channel type corresponding to the mute mode.

2. The method of claim 1, further comprising, connecting with another electronic device in response to the selection of the recommended contact.

3. The method of claim 1, wherein the preferred communications channel type is changed based on a type of communications network to which the electronic device is connected.

4. The method of claim 1, wherein an initial preferred communications channel type is changed to another communications channel type when the recommended contact is unavailable at the initial preferred communications channel type.

5. The method of claim 1, wherein the communication channel type corresponding to the mute mode includes one of a messenger communications channel and an e-mail communications channel.

6. The method of claim 1, wherein the current context information is based on at least one of a current position of the electronic device and current time.

7. The method of claim 1, wherein a plurality of communication channel types includes one of a telephony communications channel, a text message transmission service communications channel, a multimedia message service communications channel, a social networking service communications channel, an instant messaging communications channel, an e-mail communications channel, and an on-line discussion application communications channel.

8. The method of claim 1, wherein the recommended contact is determined based on at least one of:

a start time of each of one or more prior communications with the recommended contact, an end time of each of one or more prior communications with the recommended contact, a duration of each of one or more prior communications with the recommended contact, whether each of the prior communications is outgoing or incoming, and content exchanged over a course of each of one or more prior communications with the recommended contact.

9. The method of claim 1, wherein determining the recommended contact and the preferred communication channel type comprises:

identifying prestored context information corresponding to the current context information;

selecting the recommended contact and the preferred communication channel type which are mapped to the prestored context information.

10. The method of claim 1, further comprising, displaying the recommended contact and the preferred communication channel type when the notification mode of the electronic device is not the mute mode.

11. An electronic device, comprising:

a display; and a processor configured to:

detect current context information of the electronic device, determine, based on the current context information, a recommended contact and a preferred communication channel type, determine whether a notification mode of the electronic device is a mute mode;

when the notification mode of the electronic device is the mute mode, change the preferred communication channel type to a communication channel type corresponding to the mute mode, control the display to display the recommended contact and the communication channel type corresponding to the mute mode;

detect an input for selecting the recommended contact and the communication channel type corresponding to the mute mode; and in response to detecting the input, automatically establish a connection with the recommended contact over the communications channel type corresponding to the mute mode.

12. The electronic device of claim 11, wherein the processor is further configured to connect with another electronic device in response to the selection of the recommended contact.

13. The electronic device of claim 11, wherein an initial preferred communications channel type is changed to another communications channel type based on a type of communications network to which the electronic device is connected.

14. The electronic device of claim 11, wherein an initial preferred communications channel type is changed based on availability of the recommended contact at the preferred communications channel.

15. The electronic device of claim 11, wherein the communication channel type corresponding to the mute mode includes one of a messenger communications channel and an e-mail communications channel.

16. The electronic device of claim 11, wherein the current context information is based on at least one of a current position of the electronic device and current time.

17. The electronic device of claim 11, wherein a plurality of communication channel type includes one of a telephony communications channel, a text message transmission service communications channel, a multimedia message service communications channel, a social networking service communications channel, an instant messaging communications channel, an e-mail communications channel, and an on-line discussion application communications channel.

18. The electronic device of claim 11, wherein the processor is configured to:

identify prestored context information corresponding to the current context information; and select the recommended contact and preferred communication channel type which are mapped to the prestored context information.

19. The electronic device of claim 11, wherein the recommended contact is determined based on at least one of:

a start time of each of one or more prior communications with the recommended contact, an end time of each of one or more prior communications with the recommended contact, a duration of each of one or more prior communications with the recommended contact, whether each of the prior communications is outgoing or incoming, and content exchanged over a course of each of one or more prior communications with the recommended contact.

20. The electronic device of claim 11, wherein the processor is further configured to control the display to display the recommended contact and the preferred communication channel type when the notification mode of the electronic device is not the mute mode.

* * * * *